(12) United States Patent
Arold et al.

(10) Patent No.: US 6,244,952 B1
(45) Date of Patent: Jun. 12, 2001

(54) VENTILATION ASSEMBLY FOR A PASSENGER VEHICLE

(75) Inventors: Klaus Arold, Sindelfingen; Dieter Heinle, Pluederhausen; Erich Kubsch, Weil der Stadt, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/400,435

(22) Filed: Sep. 21, 1999

(30) Foreign Application Priority Data

Sep. 22, 1998 (DE) .............................................. 198 43 364

(51) Int. Cl.$^7$ ...................................................... B60H 1/00
(52) U.S. Cl. ............................................ 454/145; 454/315
(58) Field of Search ..................................... 454/145, 108, 454/109, 315, 322, 327

(56) References Cited

U.S. PATENT DOCUMENTS

| | | | |
|---|---|---|---|
| 4,223,754 | 9/1980 | Mizuno et al. | 180/90 |
| 5,741,179 | * 4/1998 | Sun et al. | 454/155 |

FOREIGN PATENT DOCUMENTS

| | | |
|---|---|---|
| 4300910 | 3/1994 | (DE) . |
| 43 27 266C1 | 8/1994 | (DE) . |
| 0596446A1 | * 5/1994 | (EP) . |
| 2 208 427 | 3/1989 | (GB) . |
| 2 299 855 | 10/1996 | (GB) . |

OTHER PUBLICATIONS

Patent Specification 953,345 (Renault and Suisse), Vehicular Ventilation System, published Mar. 25, 1964.
Patent Specification 1,129,404 (Vauxhall Motors Limited), Vehicular Ventilation System, published Oct. 2, 1968.

* cited by examiner

*Primary Examiner*—Jiping Lu
(74) *Attorney, Agent, or Firm*—Evenson, McKeown, Edwards & Lenahan, P.L.L.C.

(57) ABSTRACT

A ventilation assembly for installing in the dashboard of a motor vehicle has having a housing which has an air-inlet opening for fitting on an air-feed duct and also two air-outlet openings which are arranged one above the other in the installation position and lie in two planes at an angle to each other. Two air ducts are formed in the housing, each connecting one of the two air-outlet openings to the air-inlet opening. The quantities of air flowing into the two air ducts is metered. The end side of the lower air duct which leads to the lower air-outlet opening encloses the air-inlet opening, and the upper air duct, which leads to the upper air-outlet opening, encloses a wall opening in the lower air duct. The air-quantity is metered by a pivotable air-discharge flap which is assigned to the wall opening and is arranged in the lower duct in such a manner that its pivot axis lies on that side of the wall opening which is remote from the air-inlet opening.

36 Claims, 4 Drawing Sheets

VENTILATION ASSEMBLY FOR A PASSENGER VEHICLE

BACKGROUND AND SUMMARY OF THE INVENTION

This application claims the priority of German application 198 43 364.6, filed Sep. 22, 1998, the disclosure of which is expressly incorporated by reference herein.

The invention relates to a ventilation assembly for installing in the interior of a vehicle, in particular in the dashboard of a motor vehicle, comprising a housing which has an air-inlet opening for fitting an air-feed duct on and also two air-outlet openings which are arranged one above the other in an installation position and lie in two planes at an angle to each other, and in which housing two air ducts are formed, each connecting one of the two air-outlet openings to the air-inlet opening, and a meter operable to control quantities of air flowing into the two air ducts.

A known ventilation element of this general type (German Patent Document DE 43 27 266 C1), where it is called an air nozzle, is used for the interior ventilation of a vehicle on the front-passenger side and is installed for this purpose in the lateral dashboard region. The housing widens in the manner of a funnel from the air-inlet opening, and the two air ducts, which lead to the air-outlet openings, are formed by an interior dividing wall and the housing walls. The quantities of air supplied to the air ducts can be set separately, via a pivotable air flap respectively assigned to an air duct, one air flap being arranged in a duct opening, which is formed by the dividing wall and the lower and lateral housing wall, and the other air flap being arranged in a duct opening, which is formed by the dividing wall and the upper and lateral housing wall. The two duct openings lead into the common air-inlet opening.

Of the two housing outlet openings, which lie vertically one above the other in planes at an angle to each other at the other end of the air ducts, the upper air-outlet opening is provided with fixed longitudinally and transversely extending air-guiding fins, while the lower air-outlet opening has adjustable transverse or horizontal fins and adjustable longitudinal or vertical fins. For the longitudinal fins to be adjustable, they are mounted in the housing in a manner such that they can be pivoted about a pivot axis and can be displaced by hand using a slider which is guided on a transverse fin. The transverse fins are coupled laterally to one another and can be pivoted upwards and downwards by a tilting movement of the slider held on the transverse fin.

In order to operate the two air flaps, in the housing laterally next to the lower air-outlet opening a hand wheel, for manual control, and also a remote control, which can be implemented, for example, by means of a Bowden cable, are provided. The manual control acts on the lower air flap, which is assigned to the lower air duct, and the remote control acts on the upper air flap, which is assigned to the upper air duct. The two air flaps are connected to each other via coupling means which enables the upper air flap, with the opening of the lower air flap by the manual control, to move into its closed position, and also enables the lower air flap, with the opening of the upper air flap by the remote control, to move into its closed position. This automatic coupling of the air flaps results in the air nozzle being set by remote control to the defrosting and demisting function and being able to be reset to individual interior ventilation by manual control by the front-seat passenger.

An object of the invention is to refine a ventilation element of the type mentioned above in such a manner that individually adjustable interior ventilation which is as free as possible from drafts is achieved.

According to preferred embodiments of the invention, this object is achieved by providing an assembly wherein an end side of the lower air duct, which leads to the lower air-outlet opening, encloses the air-inlet opening, wherein an end side of the upper air duct, which leads to the upper air-outlet opening, encloses a wall opening in the lower air duct, and wherein the meter has a pivotable air-discharge flap which optionally closes and opens the wall opening and is arranged in the lower air duct in such a manner that its pivot axis lies close to the wall opening on a side of said wall opening which is remote from the air-inlet opening.

The ventilation assembly according to the invention has the advantage that when the access to the upper air duct is opened, the air-discharge flap pivots into the lower air duct and in doing so forms an air-guiding element which diverts some of the airflow entering into the lower air duct through the air-inlet opening into the upper air duct which then emits it into the interior via the upper air-outlet opening which is somewhat directed away from the vehicle passengers. With the air-discharge flap pivoted away to the maximum and therefore with the cross section of the wall opening to the upper air duct released or opened to the maximum, there is a 50% division of the quantity of air, so that the maximum air supply to the ventilation element results all in all in extensive, draft-free ventilation.

Advantageous embodiments of the ventilation assembly according to the invention with expedient refinements and developments of the invention are described herein and in the claims.

According to an advantageous feature of preferred embodiments of the invention, the air-inlet opening is assigned a control member which adjusts the free opening cross section of it, and a controller for operating the air-discharge flap is designed in such a manner that only when the air-inlet opening is fully released by the control member is the opening of the air-discharge flap initiated. A control member of this type is used for air metering in automatic operation and is realized, for example, by an electrically adjustable pivoting flap in the air-guiding duct or in the housing of the ventilation element. By the controller in this case the air-discharge flap is only acted upon, for the purpose of opening the upper air duct, if the maximum quantity of airflows into the lower air duct and extensive distribution of the air over two air-outlet planes is therefore required for the purpose of obtaining draft-free ventilation.

According to a preferred embodiment of the invention, the ventilation element, as a so-called central nozzle, is used for individual ventilation of the left-hand and right-hand interior of the vehicle, for which purpose the lower and upper air duct, the lower and upper air-outlet opening and the air-discharge flap are in each case present in duplicate and are arranged in the housing in a mirror-symmetrical manner to the housing center. The two lower ducts which are now present are separated from each other by a chamber and the two upper air ducts which are now present are separated from each other by a partition wall which protrudes on the upper side of the chamber. The chamber has an insertion opening which lies in a plane with the lower outlet openings and, according to an advantageous feature of preferred embodiments of the invention, is used to accommodate a box-shaped insert, preferably an electronic box, which protrudes in front of the plane of the lower air-outlet openings and bears two adjusting wheels. The adjusting wheels protrude on an end side of the electronic box shaped insert and have rotational axes aligned parallel to the plane of the air-outlet opening, for manually operating in each case one of the two air-discharge flaps. This insert holds the controller for the two air-discharge flaps and also contains further components for setting the temperature and automatic ventilation.

According to an advantageous feature of preferred embodiments of the invention, the controller for operating in each case one of the two air-discharge flaps have a slotted-link segment which is arranged rotatably in the insert and is operatively engaged to the adjusting wheel, which is assigned to the particular air-discharge flap. The slotted-link segment bears a curved guide groove into which a guide pin, which is arranged on the air-discharge flap, projects in a manner such that it can be displaced longitudinally therein. The guide groove has a groove section which is concentric to the segment pivot, and an eccentric groove section continuing on from it. As long as the guide pin is situated in the concentric groove section, force is not exerted on the air-discharge flap, and the latter remains in its closed position. In this region, rotation of the adjusting wheel causes activation of the electric pivoting drive of the control member which releases the opening cross section of the air-inlet opening to a maximum at the end of the concentric groove section. If, during further rotation of the adjusting wheel, the guide pin then enters into the eccentric groove section, the air-discharge flap is pivoted away from the wall opening to the upper air duct and at the end of the groove section reaches its maximum pivoted-away position.

According to a preferred embodiment of the invention, in the two lower air-outlet openings, vertically aligned air-guiding fins are arranged pivotably at a parallel distance from one another in such a manner that their front edges, which point in the air-emission direction, are approximately flush with the plane of the two air-outlet openings. A shell which covers the two housing planes having the lower and upper air-outlet openings is clipped onto the housing, the shell having cutouts which are congruent with the air-outlet openings, the two cutouts, which release the lower air-outlet openings, being provided with horizontally aligned air-guiding fins, which are arranged pivotably at a parallel distance from one another. The cutout, which releases the upper air-outlet openings, is provided with fixed air-guiding fins which extend parallel to the horizontal air-guiding fins. This additional covering shell results in a closed overall image of the ventilation assembly which can be individually adapted to the design of the interior, by appropriate refinement of the covering shell, so that the housing of the ventilation element can be used universally in vehicles of differing design. The covering shell can be quickly fitted onto the housing by simple clipping-on and in addition to the additional technical elements for the ventilation, e.g. the air-guiding fins, can also contain other style elements.

Other objects, advantages and novel features of the present invention will become apparent from the following detailed description of the invention when considered in conjunction with the accompanying drawings.

DETAILED DESCRIPTION OF THE DRAWINGS

Figure 1:
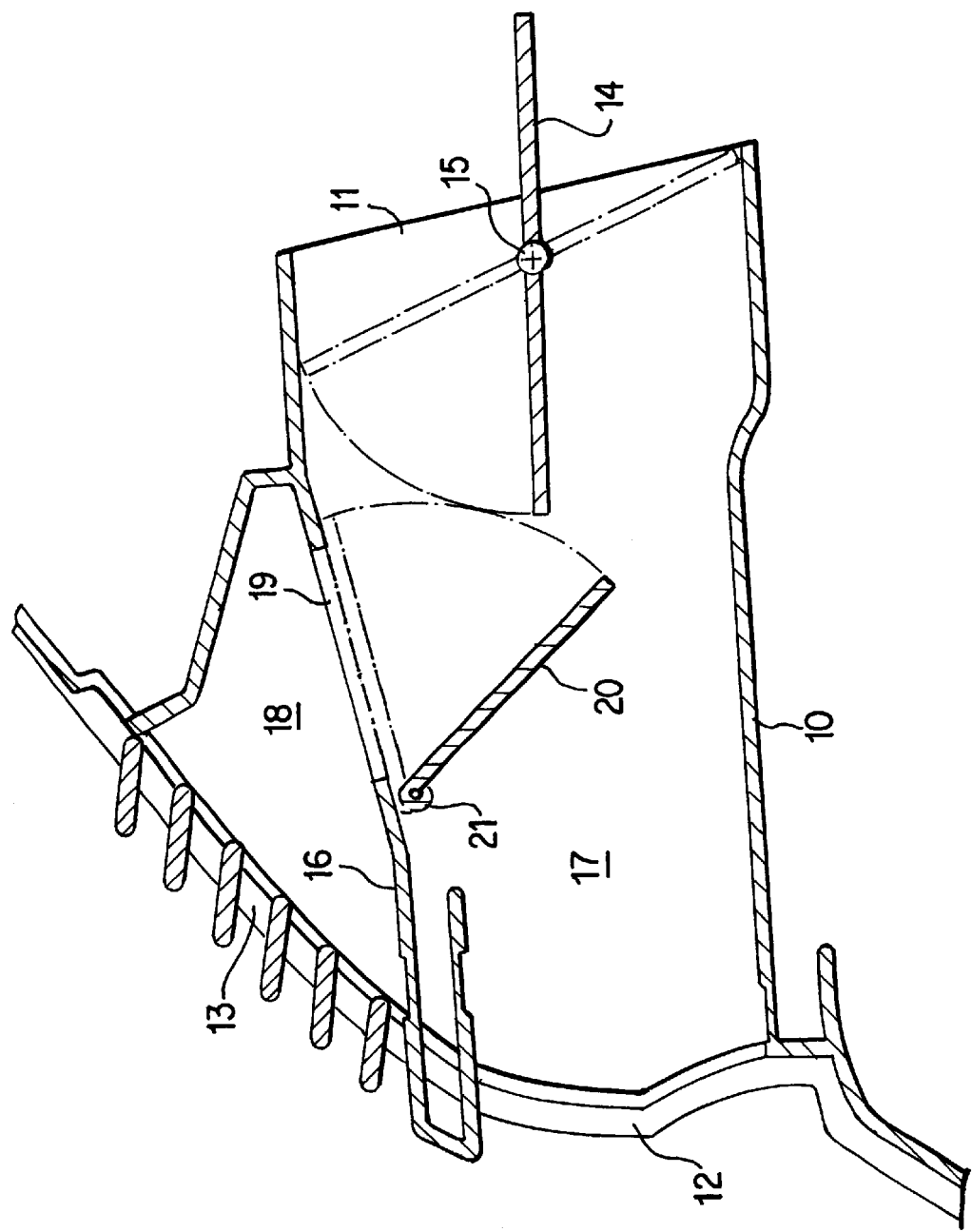
FIG. 1 is a longitudinal sectional view of a ventilation assembly for ventilating a vehicle interior, constructed according to a preferred embodiment of the present invention.

The ventilation assembly which is represented in longitudinal section in FIG. 1, for the interior ventilation of a vehicle has a housing 10 having an air-inlet opening 11 and two air-outlet openings, which are arranged vertically one above the other in the installation position. The air outlet opening lies in two planes at an angle to each other and of which the lower air-outlet opening is denoted by 12 and the upper air-outlet opening by 13. In the installation position, the ventilation element is fitted with an air-inlet opening 11, onto an air-feed duct (not represented here) and the air-inlet opening 11 is assigned a control member 14 which sets its free opening cross section. The control member 14, which is designed here as an air flap which can be pivoted about a centrally arranged pivot axis 15, is arranged in the housing 10 in the exemplary embodiment represented, but may also be accommodated in the feed duct if a reduced overall length of the housing 10 is required.

By means of a tapered dividing wall 16 a lower air duct 17 and an upper air duct 18 are formed in the housing 10, the air ducts respectively leading into one of the two air-outlet openings 12, 13. In this case, the lower air duct 17 encloses the air-inlet opening 11 at its end which is remote from the lower air-outlet opening 12, while the upper air duct 18 joins the upper air-outlet opening 13 to a wall opening 19 in the dividing wall 16. The wall opening 19 can optionally be closed and released by means of a pivotable air-discharge flap 20, for which purpose the air-discharge flap 20 is arranged in the lower air duct 17 in such a manner that its pivot axis 21, which is secured on the dividing wall 16, lies on that side of the wall opening 19 which faces away from the air-inlet opening 11. In this case, the air-discharge flap 20 is designed in such a manner that in its maximum pivoted-away position from the wall opening 19, which position is shown in FIG. 1, it encloses an acute angle with the dividing wall 16 and only partially closes the clear cross section of the lower air duct 17. This maximum pivoting position of the air-discharge flap 20 is designed in such a manner that when the quantity of airflow in the air-inlet opening 11 is at a maximum, there is a 50% division of the quantity of air to the air ducts 17, 18. In FIG. 1, a controller (not represented) for operating the air-discharge flap 20 is designed in such a manner that only when the air-inlet opening 11 is fully released or opened by the control member 14—as is represented in FIG. 1—is the opening of the air-discharge flap 20 initiated. The closed positions of the control member 14 and of the air-discharge flap 20 are indicated in FIG. 1 by dashed lines. In the pivoting region between the opening and closed position the control member 14 and also the air-discharge flap 20 can be set to any desired position.

Figure 2:
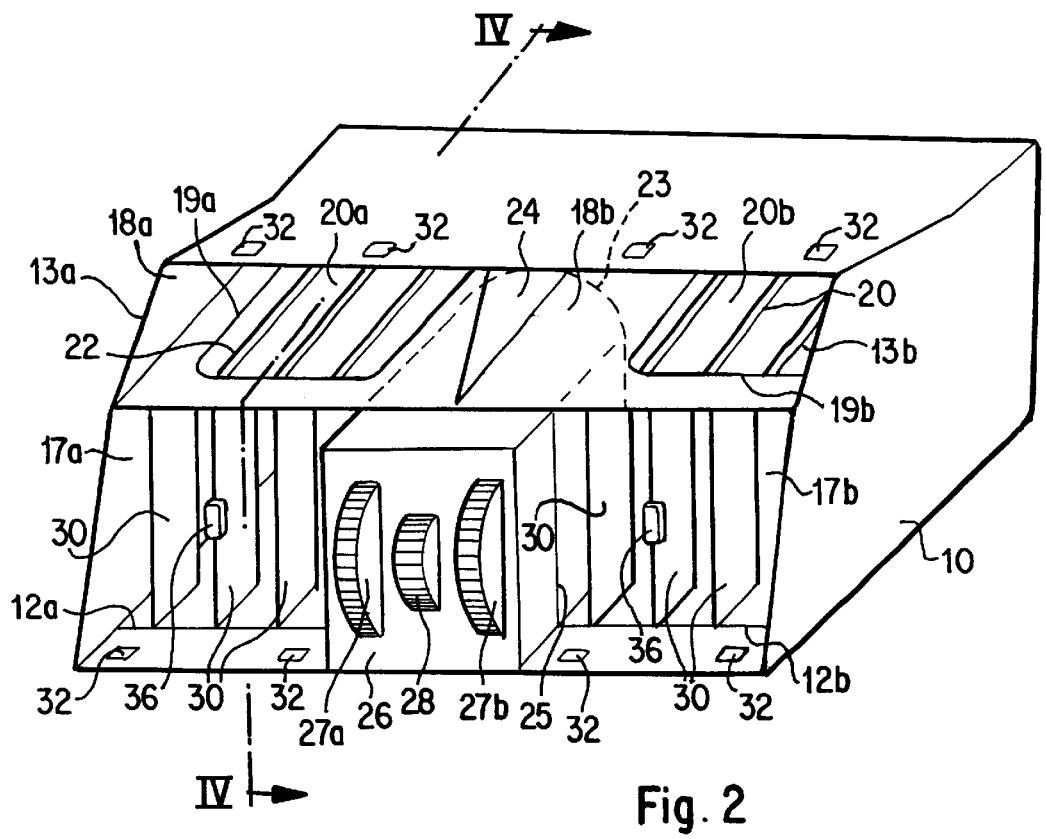
FIG. 2 is a perspective representation of part of a ventilation element which is designed for installation in the dashboard of a motor vehicle as a central nozzle having left-hand/right-hand separation of the interior ventilation, constructed according to a preferred embodiment of the present invention.
Figure 3:
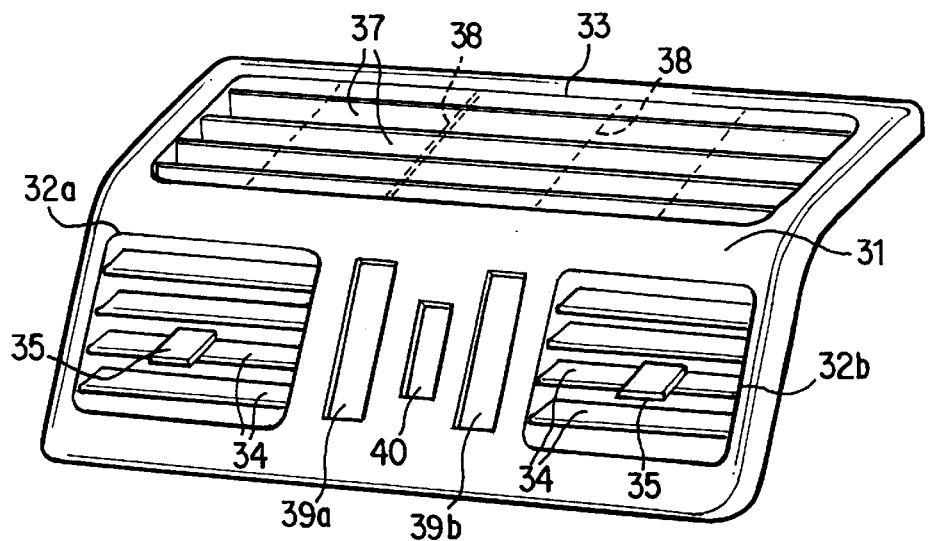
FIG. 3 is a perspective view of the other part of the ventilation element in FIG. 2.

The assembly of the parts represented respectively in FIGS. 2 and 3 produces a ventilation assembly which is intended for installation in the dashboard or the instrument panel of a passenger vehicle as a central nozzle having left-hand/right-hand separation of the interior ventilation. FIG. 2 shows a basic housing 10 and FIG. 3 shows a covering shell 31 which can be placed onto the front side of the basic housing 10. The ventilation assembly according to FIGS. 2 and 3, which is designed as a central nozzle, is principally of the same design as the ventilation element represented in FIG. 1, with the difference that in the housing 10, for individual setting of the ventilation in the left-hand and right-hand half of the vehicle, the lower air duct 17 having the lower air-outlet opening 12, the upper air duct 18 having the upper air-outlet opening 13, the wall opening 19 in the dividing wall 16 and the air-discharge flap 20, which is assigned to the wall opening 19, are in each case present in duplicate and are arranged in the housing 10 in a mirror-symmetrical manner to the housing center. The two lower air ducts 17 lead into the air-outlet opening 11 to which the air-feed duct is connected in the installation position, which duct contains the control member 14 (FIG. 1) for setting the free opening cross section of the air-inlet opening 11.

In FIG. 2, the two lower air-outlet openings are denoted by 12a and 12b, the two upper air-outlet openings are denoted by 13a and 13b, the two wall openings are denoted by 19a and 19b and the two air-discharge flaps by 20a and 20b. The two lower air ducts 17a and 17b are separated from each other by a chamber 23 and the two upper air ducts 18a and 18b are separated from each other by a partition wall 24, which protrudes on the upper side of the chamber 23. The chamber 23 has an insertion opening 25 which lies in a plane with the lower air-outlet openings 12a and 12b and bears on its rear side, since the depth of the chamber 23 is smaller than the length of the lower air ducts 17a and 17b, a perpendicularly protruding separating partition 29 (FIG. 5) which reaches into the air-inlet opening 11, so that the two lower air ducts 17a and 17b are separated from each other as far as the common air-inlet opening 11.

Figure 4:
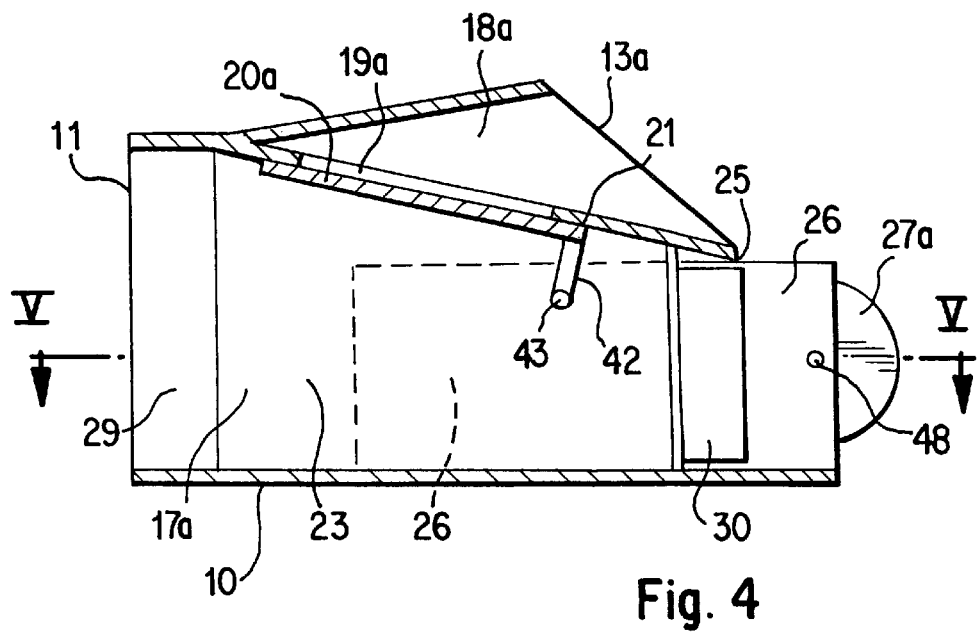
FIG. 4 is a section along the line IV—IV in FIG. 2.
Figure 5:
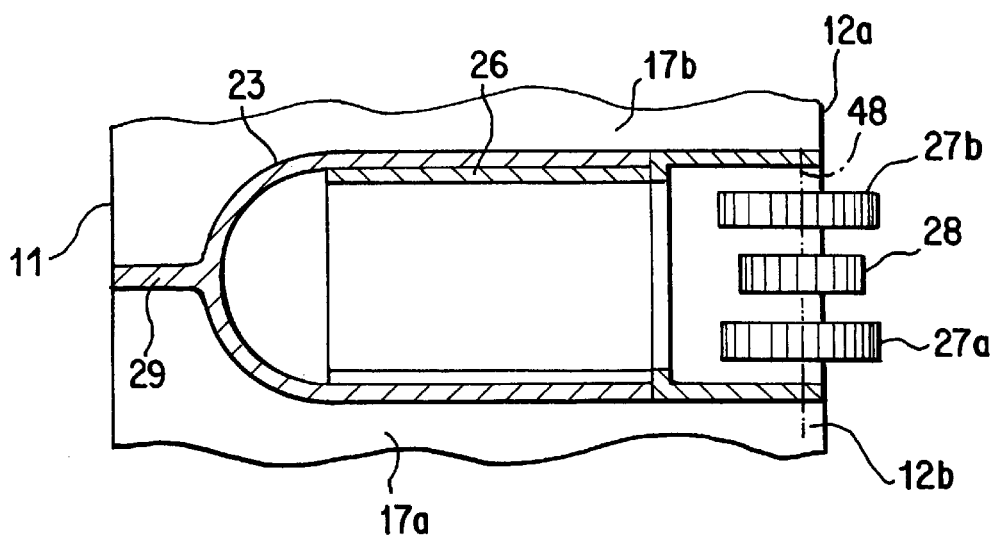
FIG. 5 is a partial sectional view along the line V—V in FIG. 4.

As FIGS. 2, 4 and 5 show, the chamber 23 accommodates a box-shaped insert which is designed as an electronic box 26, protrudes in front of the plane of the lower air-outlet openings 12a and 12b and has two adjusting wheels 27a and 27b, which protrude on its end side, for manually operating in each case one of the two air-discharge flaps 20a and 20b. A third adjusting wheel 28, which is arranged centrally between the two adjusting wheels 27a, 27b, serves for preselection of the temperature. All three adjusting wheels 27a, 27b and 28 can be pivoted in the electronic box 26 about a rotational axis 48, which is aligned parallel to the plane of the lower air-outlet openings 12a and 12b, and protrude with part of their wheel circumference over the front side of the electronic box 26.

In the two lower air-outlet openings 12a and 12b vertically aligned air-guiding fins 30 are arranged pivotably in parallel and at a distance from one another in such a manner that their front edges, which point in the air-emission direction, are approximately flush with the plane of the two air-outlet openings 12a and 12b.

The covering shell 31, which is represented perspectively in FIG. 3, is clipped onto the housing 10 in such a manner that it covers the two housing planes which contain the lower and upper air-outlet openings 12a, 12b and 13a, 13b. For the clip connection, latching recesses 32 are provided in the housing 10, into which recesses latching lugs, which are arranged on the rear side of the covering shell 31 and which cannot be seen in FIG. 3, latch. The covering shell 31 has two cutouts 32a and 32b, which are congruent with the lower air-outlet openings 12a and 12b, and a cutout 33 which releases or opens to the two upper air-outlet openings 13a and 13b. The two lower cutouts 32a and 32b are provided with air-guiding fins 34 which are aligned horizontally in the installation position, are arranged pivotably and parallel at a distance from one another and in the installation position lie in front of the vertical fins 30 in the air-outlet openings 12a and 12b.

For the pivoting movement, the horizontal fins 34 are coupled to one another in the same manner as the vertical fins 30 in the air-outlet openings 12a, 12b, and a slider 35 is located on one of the horizontal fins 34, by means of which slide the horizontal fins 34 can be pivoted upwards or downwards. As is known and is not represented in more detail here, the slider 35 bears vertical teeth which, when the covering shell 31 is placed onto the housing 10, engage in identically designed vertical teeth of a driver 36, which is located on one of the vertical fins 30. If the slider 35 is moved to the left or right, the vertical fin 30, which bears the driver 36, and the other vertical fins 30, which are coupled to the first vertical fin, are pivoted to the left or right via the toothed connection. The cutout 33, which releases or opens the upper two air-outlet openings 13a and 13b, is provided with fixed air-guiding fins 37 which extend parallel to the horizontal air-guiding fins 34 and are further reinforced by cross webs 38 which are only outlined in FIG. 3. In that central region of the covering shell 31, which region remains between the two lower cutouts 32a and 32b and which covers the front side of the electronic box 26, cutouts 39a and 39b for the two adjusting wheels 27a and 27b and a cutout 40 for the adjusting wheel 28 to penetrate through are provided.

Figure 6:
FIG. 6 is a plan view of an air-discharge flap in the ventilation element according to FIGS. 2–5.
Figure 7:
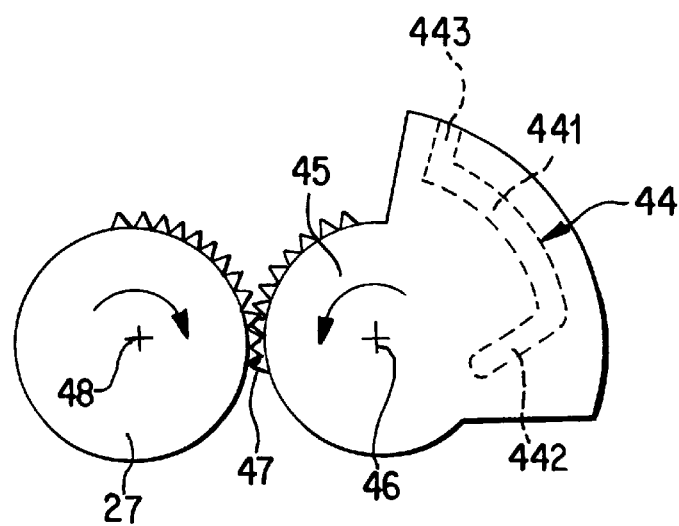
FIG. 7 is a plan view of the control means for operating the air-discharge flap in the direction of the arrow VII in FIG. 6.

An air-discharge flap 20 and the controller for operating it are respectively represented in FIGS. 6 and 7 in plan view. This representation applies for each of the two air-discharge flaps 20a and 20b arranged in the lower air ducts 17a and 17b. The air-discharge flap 20 is held by protruding bearing pins 41 in the housing wall and in the chamber wall in a manner such that it can be pivoted about its pivot axis 21. To the bearing pin 41, which is held in the chamber 23, there is fixedly connected a bracket 42 which protrudes radially from the bearing pin 41 from which in turn a bearing pin 41 protrudes at right angles and therefore extends parallel to the guide pin 43. The guide pin 43 engages into a guide groove 44 of a slotted-link segment 45 and is guided in a manner such that it can be displaced longitudinally therein. The slotted-link segment 45 is held, in a manner such that it can be rotated about a rotational axis 46, on the electronic box 26 and is connected via a toothing 47 to the adjusting wheel 27 which, as already mentioned, is mounted with a rotational axis 48 in the electronic box 26. The toothing 47 extends over somewhat more than 90° of the wheel and segment circumference. The guide groove 44 has a groove section 441, which is concentric to the rotational axis 46, and an eccentric groove section 442 continuing on from it. The guide groove 44 on the slotted-link segment 45 is designed in such a manner that the groove section 441 extends approximately over a rotational angle of about 55° of the adjusting wheel 27 and the groove section 442 extends over a rotational angle of approximately 35°. At the start of the concentric groove section 441 there is formed an entry section 443 via which the guide pin 43 on the air-discharge flap 20 slides into the guide groove 44 as the electronic box 26 is being inserted into the chamber 23.

If the adjusting wheel 27 is rotated on from its basic position, which is represented in FIG. 7, the slotted-link segment 45 is pivoted about its rotational axis 46 and the guide pin 43 initially remains within the guide groove 44 in the concentric groove section 441, so that no adjustment of the air-discharge flap 20 takes place, the latter just remaining in its position closing the wall opening 19. This adjusting region of the adjusting wheel 27, which region extends over approximately 55°, is used for automatic operation and for setting the control member 14 (FIG. 1) into a desired pivoting position within the possible pivoting region. If the adjusting wheel 28 is rotated through approximately 55°, on further rotation of the adjusting wheel 27 the guide pin 43 enters into the eccentric groove section 442, thereby initiating a pivoting movement of the air-discharge flap 20 in the opening direction. If the adjusting wheel 27 is rotated through approximately a further 35°, the guide pin 43 reaches the end of the eccentric groove section 442, and the air-discharge flap is located in its maximum opening position (which is represented in FIG. 1) in which a 50% division of the air quantity entering via the air-inlet opening 11, which is fully released by the control member 14, is set at the lower air duct 12 and the upper air duct 13.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A ventilation assembly for a passenger vehicle space comprising:
    a housing with an air inlet opening and first and second air outlet ducts, said first outlet duct extending substantially horizontally to a first air outlet opening to a passenger space when in an in use installed position, said second outlet duct extending angularly to a second air outlet opening to the passenger space with respect to the first outlet opening, said first outlet duct being bounded by upper and lower fixed walls adapted to be fitted onto an air feed duct,
    a wall opening in the upper fixed wall connecting the first and second outlet ducts at a position upstream of the passenger space, said wall opening being disposed intermediate ends of the upper fixed wall, and
    a pivotal air discharge flap operable to control flow of air through said outlet ducts by optionally closing and opening the wall opening, said discharge flap being pivotable about a discharge flap axis disposed at a side of the discharge flap which is opposite the side thereof adjacent the air inlet opening.

2. A ventilation assembly according to claim 1, wherein said first duct is a lower duct disposed below the second duct which is an upper duct, said first air outlet opening being a lower air outlet opening and the second air outlet opening being an upper air outlet opening.

3. A ventilation assembly according to claim 2, wherein said upper fixed wall is a common wall of said first and second ducts.

4. A ventilation assembly according to claim 3, wherein the air-discharge flap is configured such that in its maximum pivoted-away position from the wall opening it encloses an acute angle with respect to the upper fixed wall and only partially covers a clear cross section of the lower air duct.

5. Ventilation assembly according to claim 3, wherein for the purpose of use as a central nozzle inserted in a vehicle dashboard and having left-hand/right-hand separation of the interior ventilation, the lower and upper air outlet ducts, the lower and upper air-outlet openings and the air-discharge flap are in each case present in duplicate and are arranged in the housing in a mirror-symmetrical manner to the housing center.

6. Ventilation assembly according to claim 2, wherein for the purpose of use as a central nozzle inserted in a vehicle dashboard and having left-hand/right-hand separation of the interior ventilation, the lower and upper air outlet ducts, the lower and upper air-outlet openings and the air-discharge flap are in each case present in duplicate and are arranged in the housing in a mirror-symmetrical manner to the housing center.

7. Ventilation assembly according to claim 6, wherein the two lower air ducts are separated from each other by a chamber and the two upper air ducts are separated from each other by a partition wall, which protrudes on the upper side of the chamber, and
    wherein the chamber has an insertion opening lying in a plane with the lower outlet openings.

8. Ventilation assembly according to claim 7, wherein the depth of the chamber is smaller than the length of the lower air ducts, and
    wherein a separating partition which reaches as far as the air-inlet opening protrudes from the rear side of the chamber which is remote from the insertion opening.

9. Ventilation assembly according to claim 8, wherein the chamber accommodates a box-shaped insert which protrudes on the front side in front of the plane of the lower air-outlet openings and has two adjusting wheels which protrude on its end side and have a rotational axis which is aligned parallel to the plane of the lower air-outlet openings, for manually operating in each case one of the two air-discharge flaps.

10. Ventilation assembly according to claim 9, wherein a controller is provided for operating in each case one of the two air-discharge flaps and has a slotted-link segment which is arranged rotatably in the insert and is operatively engaged to the adjusting wheel which is assigned to the air-discharge flap,
    wherein the slotted-link segment bears a guide groove into which a guide pin which is arranged on the air-discharge flap projects in a longitudinally displaceable manner, and
    wherein the guide groove has a groove section which is concentric to the segment pivot, and an eccentric groove section continuing on from the concentric groove segment.

11. Ventilation assembly according to claim 8, wherein vertically aligned air-guiding fins are arranged pivotably in parallel at a distance from one another in the two lower air-outlet openings in such a manner that their front edges, which point in an air-emission direction, are approximately flush with the plane of the two outlet openings,
    wherein a covering shell is clipped onto the housing, the covering shell covering two housing planes having the lower and upper air-outlet openings and having cutouts which are congruent with the air-outlet openings,
    wherein the two cutouts which release the lower air-outlet openings are provided with horizontally aligned air-guiding fins which are arranged pivotably and at a parallel distance from one another, and
    wherein the cutout which releases the upper air-outlet openings is provided with fixed air-guiding fins which extend parallel to the horizontally aligned air-guiding fins.

12. Ventilation assembly according to claim 11, wherein the covering shell has cutouts for two adjusting wheels to penetrate through and rests on the front side of the insert.

13. Ventilation assembly according to claim 8, wherein reinforcing struts, which extend parallel to one another are arranged in the two wall openings of the two lower air ducts.

14. Ventilation assembly according to claim 7, wherein the chamber accommodates a box-shaped insert which protrudes on the front side in front of the plane of the lower air-outlet openings and has two adjusting wheels which protrude on its end side and have a rotational axis which is aligned parallel to the plane of the lower air-outlet openings, for manually operating in each case one of the two air-discharge flaps.

15. Ventilation assembly according to claim 14, wherein a controller is provided for operating in each case one of the two air-discharge flaps and has a slotted-link segment which is arranged rotatably in the insert and is operatively engaged with the adjusting wheel which is assigned to the air-discharge flap, wherein the slotted-link segment bears a guide groove into which a guide pin which is arranged on the air-discharge flap projects in a longitudinally displaceable manner, and wherein the guide groove has a groove section which is concentric to the segment pivot, and an eccentric groove section continuing on from the concentric groove segment.

16. Ventilation assembly according to claim 15, wherein vertically aligned air-guiding fins are arranged pivotably in parallel at a distance from one another in the two lower air-outlet openings in such a manner that their front edges, which point in an air-emission direction, are approximately flush with the plane of the two outlet openings, wherein a covering shell is clipped onto the housing, the covering shell covering two housing planes having the lower and upper air-outlet openings and having cutouts which are congruent with the air-outlet openings, wherein the two cutouts which release the lower air-outlet openings are provided with horizontally aligned air-guiding fins which are arranged pivotably and at a parallel distance from one another, and wherein the cutout which releases the upper air-outlet openings is provided with fixed air-guiding fins which extend parallel to the horizontally aligned air-guiding fins.

17. Ventilation assembly according to claim 16, wherein the covering shell has cutouts for the two adjusting wheels to penetrate through and rests on the front side of the insert.

18. Ventilation assembly according to claim 15, wherein reinforcing struts, which extend parallel to one another are arranged in the two wall openings of the two lower air ducts.

19. Ventilation assembly according to claim 14, wherein vertically aligned air-guiding fins are arranged pivotably in parallel at a distance from one another in the two lower air-outlet openings in such a manner that their front edges, which point in an air-emission direction, are approximately flush with the plane of the two outlet openings, wherein a covering shell is clipped onto the housing, the covering shell covering two housing planes having the lower and upper air-outlet openings and having cutouts which are congruent with the air-outlet openings, wherein the two cutouts which release the lower air-outlet openings are provided with horizontally aligned air-guiding fins which are arranged pivotably and at a parallel distance from one another, and wherein the cutout which releases the upper air-outlet openings is provided with fixed air-guiding fins which extend parallel to the horizontally aligned air-guiding fins.

20. Ventilation assembly according to claim 19, wherein the covering shell has cutouts for the two adjusting wheels to penetrate through and rests on the front side of the insert.

21. Ventilation assembly according to claim 14, wherein reinforcing struts, which extend parallel to one another are arranged in the two wall openings of the two lower air ducts.

22. Ventilation assembly according to claim 7, wherein vertically aligned air-guiding fins are arranged pivotally in parallel at a distance from one another in the two lower air-outlet openings in such a manner that their front edges, which point in an air-emission direction, are approximately flush with the plane of the two outlet openings, wherein a covering shell is clipped onto the housing, the covering shell covering two housing planes having the lower and upper air-outlet openings and having cutouts which are congruent with the air-outlet openings, wherein the two cutouts which release the lower air-outlet openings are provided with horizontally aligned air-guiding fins which are arranged pivotably and at a parallel distance from one another, and wherein the cutout which releases the upper air-outlet openings is provided with fixed air-guiding fins which extend parallel to the horizontally aligned air-guiding fins.

23. Ventilation assembly according to claim 22, wherein the covering shell has cutouts for two adjusting wheels to penetrate through and rests on the front side of the insert.

24. Ventilation assembly according to claim 7, wherein reinforcing struts, which extend parallel to one another are arranged in the two wall openings of the two lower air ducts.

25. Ventilation assembly according to claim 6, wherein vertically aligned air-guiding fins are arranged pivotably in parallel at a distance from one another in the two lower air-outlet openings in such a manner that their front edges, which point in an air-emission direction, are approximately flush with the plane of the two outlet openings, wherein a covering shell is clipped onto the housing, the covering shell covering two housing planes having the lower and upper air-outlet openings and having cutouts which are congruent with the air-outlet openings, wherein the two cutouts which release the lower air-outlet openings are provided with horizontally aligned air-guiding fins which are arranged pivotably and at a parallel distance from one another, and wherein the cutout which releases the upper air-outlet openings is provided with fixed air-guiding fins which extend parallel to the horizontally aligned air-guiding fins.

26. Ventilation assembly according to claim 25, wherein the covering shell has cutouts for two adjusting wheels to penetrate through and rests on the front side of the insert.

27. Ventilation assembly according to claim 26, wherein reinforcing struts, which extend parallel to one another are arranged in the two wall openings of the two lower air ducts.

28. Ventilation assembly according to claim 25, wherein reinforcing struts, which extend parallel to one another are arranged in the two wall openings of the two lower air ducts.

29. Ventilation assembly according to claim 6, wherein reinforcing struts, which extend parallel to one another are arranged in the two wall openings of the two lower air ducts.

30. A ventilation assembly according to claim 1, wherein the air-discharge flap is configured such that in its maximum pivoted-away position from the wall opening it encloses an acute angle with respect to the upper fixed wall and only partially covers a clear cross section of the lower air duct.

31. Ventilation assembly according to claim 30, wherein for the purpose of use as a central nozzle inserted in a vehicle dashboard and having left-hand/right-hand separation of the interior ventilation, the first and second air outlet ducts, the first and second air-outlet openings and the air-discharge flap are in each case present in duplicate and are arranged in the housing in a mirror-symmetrical manner to the housing center.

32. A ventilation assembly according to claim 30, wherein the air-inlet opening is assigned a control member which adjusts the free opening cross section, and wherein a controller for operating the air-discharge flap is operable such that only when the air-inlet opening is fully opened by the control member is the opening of the air-discharge flap initiated.

33. A ventilation assembly according to claim 1, wherein the air-inlet opening is assigned a control member which adjusts the free opening cross section, and wherein a controller for operating the air-discharge flap is operable such that only when the air-inlet opening is fully opened by the control member is the opening of the air-discharge flap initiated.

34. Ventilation assembly according to claim 33, wherein the control member is a pivoting flap arranged in one of the air-feed duct and the housing at a position upstream of the air-discharge flap in the direction of airflow.

35. A ventilation assembly according to claim 1, wherein a pair of mirror symmetrical sets of said outlet ducts are disposed side by side in the housing, each set of outlet ducts including separately controllable ones of said pivotable air discharge flaps.

36. Ventilation assembly according to claim 1, wherein for the purpose of use as a central nozzle inserted in a vehicle dashboard and having left-hand/right-hand separation of the interior ventilation, the first and second air outlet ducts, the first and second air-outlet openings and the air-discharge flap are in each case present in duplicate and are arranged in the housing in a mirror-symmetrical manner to the housing center.

* * * * *